United States Patent
Whalley et al.

(10) Patent No.: US 9,534,475 B2
(45) Date of Patent: Jan. 3, 2017

(54) GUI-FACILITATED CENTRALIZING METHODS AND SYSTEMS

(71) Applicant: LANDMARK GRAPHICS CORPORATION, Houston, TX (US)

(72) Inventors: Andrew James Whalley, Calgary (CA); Gustavo Adolfo Urdaneta, Houston, TX (US); Peter Gosling, Calgary (CA)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 190 days.

(21) Appl. No.: 14/154,672

(22) Filed: Jan. 14, 2014

(65) Prior Publication Data

US 2014/0351734 A1 Nov. 27, 2014

Related U.S. Application Data

(60) Provisional application No. 61/827,727, filed on May 27, 2013.

(51) Int. Cl.
| | | |
|---|---|---|
| *G06F 15/00* | (2006.01) |
| *G06F 13/00* | (2006.01) |
| *E21B 41/00* | (2006.01) |
| *E21B 47/022* | (2012.01) |

(52) U.S. Cl.
CPC ..... *E21B 41/0092* (2013.01); *E21B 47/02216* (2013.01)

(58) Field of Classification Search
CPC .................................. G06F 17/50; E21B 47/00
USPC .......... 715/700, 761–765, 771, 736
See application file for complete search history.

(56) References Cited

U.S. PATENT DOCUMENTS

| | | |
|---|---|---|
| 6,453,999 B1 | 9/2002 | Reinholdt |
| 2005/0267686 A1 | 12/2005 | Ward |
| 2006/0293872 A1 | 12/2006 | Zamora |
| 2007/0038376 A1* | 2/2007 | Beck et al. ............ 702/6 |
| 2011/0109633 A1 | 5/2011 | Sequeira, Jr. et al. |
| 2012/0188091 A1 | 7/2012 | Calleja et al. |
| 2012/0203525 A1 | 8/2012 | Rodriguez Herrera et al. |

(Continued)

FOREIGN PATENT DOCUMENTS

| | | |
|---|---|---|
| EP | 0410729 A1 | 1/1991 |
| WO | WO-2010/143201 | 12/2010 |

OTHER PUBLICATIONS

Halliburton Energy Service, Inc., "DecisionSpace Geology Software", Landmark Software & Services, Aug. 2013, 9 pgs., Citation retrieved from the internet with citation at: https://www.landmarksoftware.com/Lists/DocumentRepository/2013-08-DS-Geology-data-sheet.pdf.

(Continued)

*Primary Examiner* — Kevin Nguyen
(74) *Attorney, Agent, or Firm* — Iselin Law PLLC; Tenley Krueger (57) ABSTRACT

Graphical User Interface (GUI) facilitated centralization methods and system, including a method that includes displaying a graphical representation of a tubular string within a borehole, accepting an interactive graphical selection of a starting location for a range along the borehole, and accepting an interactive graphical selection of an ending location for the range along the borehole. The method further includes determining string stand-off device positions that provide centralization within the range, and providing said positions to field personnel assembling and placing the tubular string in the borehole.

20 Claims, 5 Drawing Sheets

(56) References Cited

U.S. PATENT DOCUMENTS

2013/0292183 A1 11/2013 Eidem et al.
2014/0009305 A1* 1/2014 Schultz et al. ............ 340/870.01
2014/0169128 A1* 6/2014 Orban et al. .................... 367/25

OTHER PUBLICATIONS

Halliburton Energy Service, Inc., "GeoProbe—Geophysical Interpretation Software", Landmark Software & Services, Aug. 2013, 9 pgs., Citation retrieved from the internet with citation at: https://www.landmarksoftware.com/Lists/DocumentRepository/2013-08-GeoProbe-data-sheet.pdf.
Halliburton Energy Service, Inc., "DecisionSpace Well planning Software—Ditch the Spreadsheets, Paper Maps—and Silos", Landmark Software & Services, 2011, 2 pgs., Citation retrieved from the internet with citation at: https://www.landmarksoftware.com/Lists/DocumentRepository/2011-ds-wellplanning-software-brochure.pdf#search=Ditch%20the%20spreadsheets%2C%20paper%20maps%E2%80%94and%20silos%2E.
Halliburton Energy Service, Inc., "DecisionSpace—Base Module", Landmark Software & Services, Nov. 2013, 4 pgs., Citation retrieved from the internet with citation at: https://www.landmarksoftware.com/Lists/DocumentRepository/2013-11-decisionspace-base-module-data-sheet.pdf.
Halliburton Energy Service, Inc., "DecisionSpace—Well Planning Software", Landmark Software & Services, Dec. 2013, 4 pgs., Citation retrieved from the internet with citation at: https://www.landmarksoftware.com/Lists/DocumentRepository/DecisionSpace-Well-Plannin•-data-sheet.pdf#search=well%20planning.
Halliburton Energy Service, Inc., "DecisionSpace —Horizontal Well Correlation Software", Landmark Software & Services, Aug. 2013, 5 pgs., Citation retrieved from the internet with citation at: https://www.landmarksoftware.com/Lists/DocumentRepository/2013-08- Horizontal-Well-Correlation-data-sheet.pdf#search=Horizontal%20Well%20Correlation%20Software.
Halliburton Energy Service, Inc., "DecisionSpace—GIS Module", Landmark Software & Services, Sep. 2013, 4 pgs., Citation retrieved from the internet with citation at: https://www.landmarksoftware.com/Lists/DocumentRepository/2013-09-decisionspace-gis-data-sheet.pdf#search=GIS%20Module.
PCT International Preliminary Report on Patentability, dated Dec. 10, 2015 GUI-faciliated Centralizing Methods and Systems Appln. No. PCT/US2014/013181 Filed Jan. 27, 2014, 6 pgs.
PCT International Search Report and Written Opinion, dated Apr. 30, 2014, Appl No. PCT/US2014/013181, "Gui-Facilitated Centralizing Methods and Systems," filed Jan. 27, 2014, 9 pgs.

* cited by examiner

GUI-FACILITATED CENTRALIZING METHODS AND SYSTEMS

CROSS-REFERENCE TO RELATED APPLICATION

This application claims priority to Provisional U.S. Application Ser. No. 61/827,727, titled "Methods and Systems for Defining Intervals of a Workstring to be Centralized" and filed May 27, 2013 by Andrew J. Whalley, Gustavo A. Urdaneta and Peter Gosling, which is incorporated herein by reference.

BACKGROUND

As the demand for oil and gas has continued to increase, oil field operators have continued to develop techniques for increasing production efficiency. Directional drilling is one such technique, which has enabled oil field operators to drill boreholes that extend and are maintained further within the production zone of a reservoir. Multiple boreholes may be drilled in a pattern radiating out in non-vertical directions from a single common borehole, or as groups of non-vertical closely clustered boreholes. Such borehole configurations allow a larger volume of the produced product to be collected at a single location through fewer wellheads.

But as a borehole deviates from a fully vertical orientation, gravity tends to decentralize pipe strings, causing them to lean towards and eventually contact the low side of the borehole wall. These pipe strings rely upon being centralized within the borehole in order to operate properly. A pipe string may become stuck or even buckle if not kept away and out of contact with the borehole wall. Such issues can be mitigated through the use of stand-off devices, which are mechanical devices mounted on pipe string segments that extend outward from the pipe string. The stand-off devices contact the borehole wall and maintain the pipe string's position near the center of the borehole. For casing strings, for example, such stand-off devices improve cementing of the casing by ensuring that the cement is of the required thickness and balanced around the casing string pipe. However, in order for stand-off devices to be effective it is important to carefully identify the locations for each stand-off device, given the forces and stresses present within a given region of a pipe string.

BRIEF DESCRIPTION OF THE DRAWINGS

A better understanding of the various disclosed embodiments can be obtained when the following detailed description is considered in conjunction with the attached drawings, in which.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Figure 1:
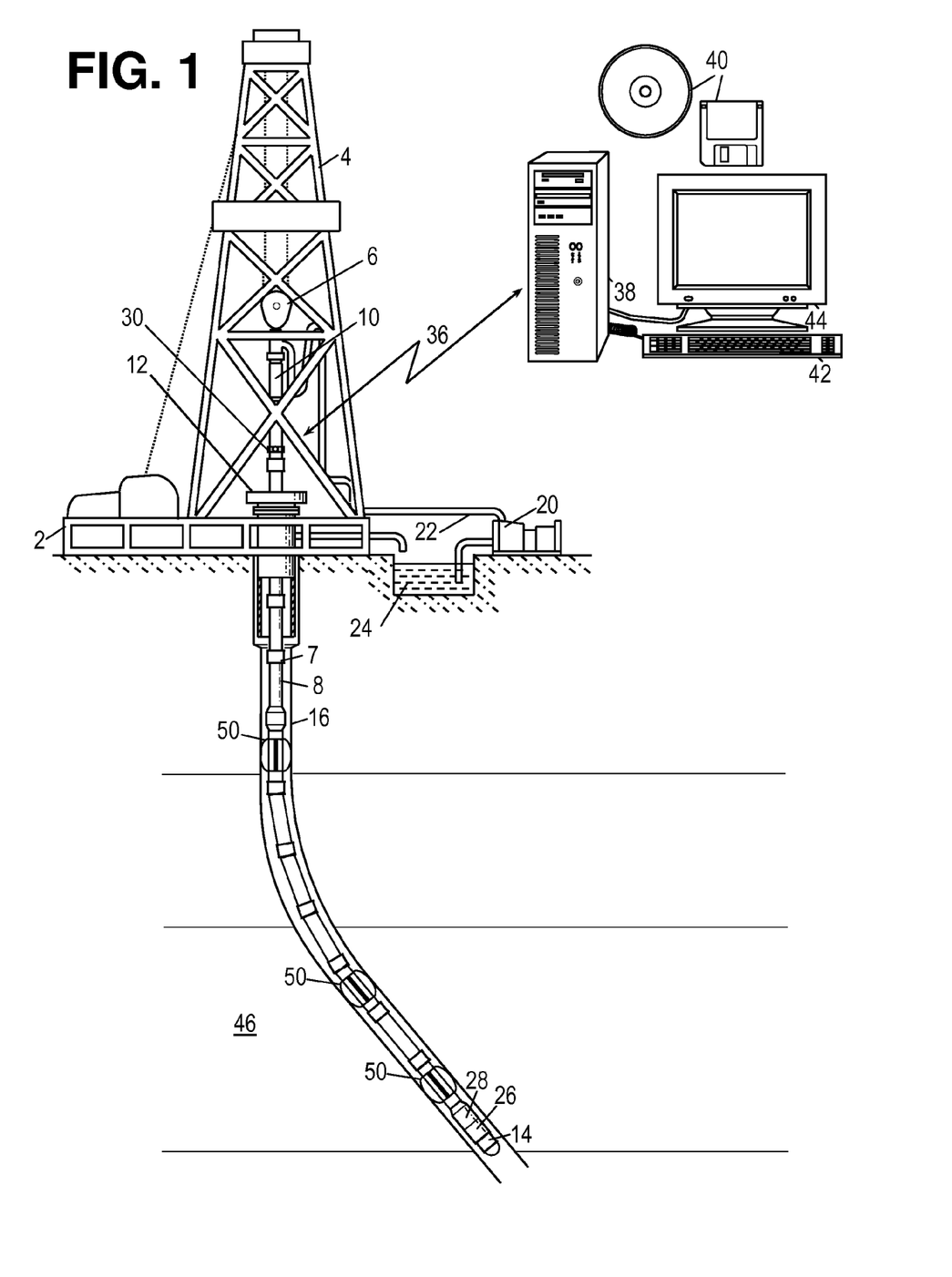
FIG. 1 shows an illustrative drilling or workover environment.

The disclosed systems are best understood when described in an illustrative usage context. Accordingly, FIG. 1 shows an illustrative drilling or workover environment. A drilling platform 2 supports a derrick 4 having a traveling block 6 for raising and lowering a pipe string 8, a drillstring, or other form of tubular string. A top drive 10 supports and optionally rotates the pipe string 8 as it is lowered through the wellhead 12. A pump 20 optionally circulates drilling fluid through a feed pipe 22 to top drive 10, downhole through the interior of pipe string 8, through orifices in tool 14, back to the surface via the annulus around drill string 8, and into a retention pit 24. The drilling fluid aids in maintaining the borehole integrity. The tool 14 may be just one piece of a bottom-hole assembly that includes one or more collars (thick-walled steel pipe) to provide weight and rigidity. The bottom-hole assembly may include logging instruments 26 to gather measurements of various environmental and formation parameters such as position, orientation, borehole diameter, cement bond, pressure, temperature, resistivity, etc.

The bottom-hole assembly further includes a ranging tool 26 to induce a current in nearby conductors such as pipes, casing strings, and conductive formations and to collect measurements of the resulting field to determine distance and direction. A telemetry sub 28 coupled to the downhole tools (including ranging tool 26) may be included to transfer measurement data to a surface receiver 30 and to receive commands from the surface. In some embodiments, the telemetry sub 28 does not communicate with the surface, but rather stores logging data for later retrieval at the surface when the logging assembly is recovered. Various forms of telemetry exist may include mud pulse telemetry, acoustic telemetry, electromagnetic telemetry, or telemetry via wired pipe segments.

The telemetry signals are supplied via a communications link 36 to a computer 38 or some other form of a data processing device. Computer 38 operates in accordance with software (which may be stored on information storage media 40) and user input via an input device 42 to process and decode the received signals. The resulting telemetry data may be further analyzed and processed by computer 38 to generate a display of useful information on a computer monitor 44 or some other form of a display device. For example, an operator could employ this system to obtain and monitor pipe string and bottom hole assembly position and orientation parameters and to issue commands for controlling the pipe string operations.

Figure 2:
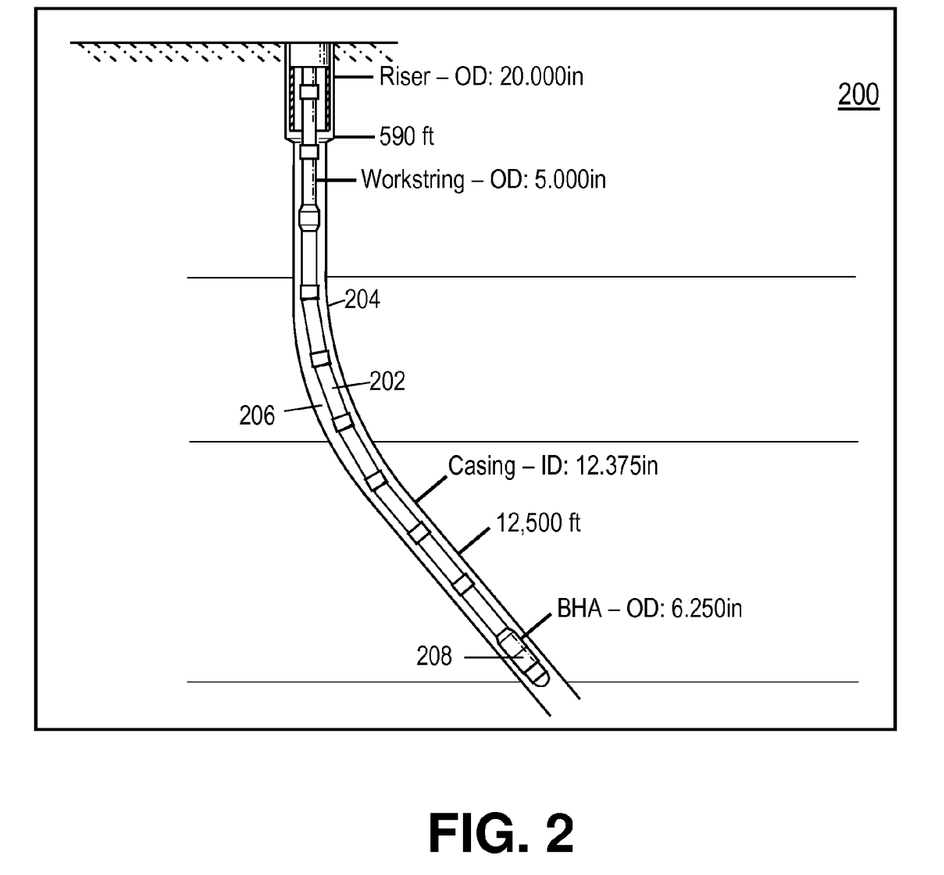
FIG. 2 shows an illustrative pipe string centralization planning display.

Continuing to refer to FIG. 1, pipe string 8 is centralized by a series of stand-off devices 50 positioned along the length of the pipe string. Using borehole geometry data (e.g., from a logging tool 26, from a wireline logging tool, or from user-provided data), a graphical representation of the borehole and a pipe string within the borehole is presented to a user using a computer system similar to computer 38 of FIG. 1. An illustrative example of such a graphical representation is shown in FIG. 2 as pipe string centralization planning display 200. A user can interact with the graphical representation 200 (e.g., using a keyboard and mouse coupled to the computer system presenting the representation on a display device), enabling the user to select locations of interest along the borehole 206. The computer system may responsively present borehole information for the selected location as shown in FIG. 2. Such information can include, for example, the outer diameter of the pipe string 202, the inner diameter of the casing 204, the inner diameter of the borehole 206, the outer diameter of the bottom hole assembly 208, and depths along the length of the borehole 206. In at least some illustrative embodiments, the user can also mark locations along the borehole 206 where the pipe string 202 may likely get stuck or buckle.

Figure 3:
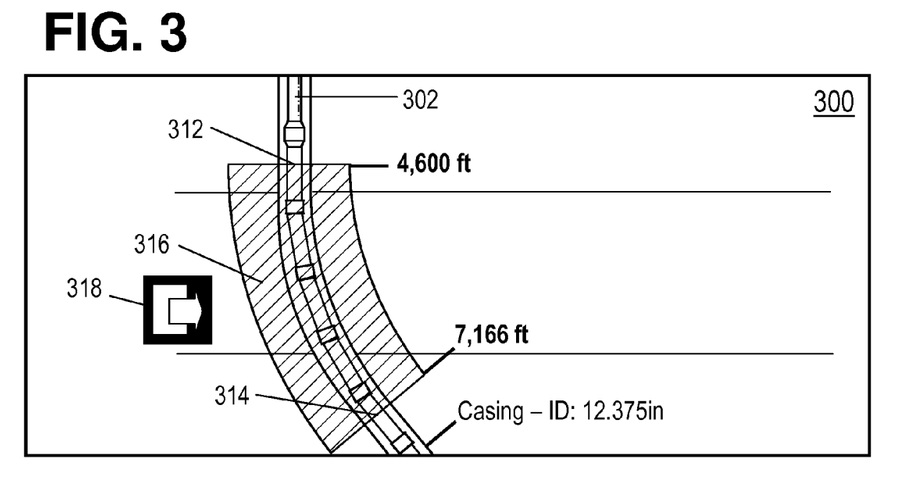
FIG. 3 shows an illustrative range definition display.

In addition to selecting locations to obtain associated logging or user provided data within the graphical representation 200, a user can also define a depth range along the borehole where the pipe string may require centralization. The range represents an area within which one or more stand-off devices are to be located as the pipe string is inserted into the well (e.g., at least one stand-off device between the start and end locations that define the range). FIG. 3 shows an example of a range definition display 300. In at least some illustrative embodiments, the user selects a menu option or button to enter a range definition mode. While in this mode, the user marks a start location 312 of a range 316 using the mouse to click on the desired location along the pipe string 302 and then drags an end location 314 to the desired depth. When the end location is at the desired location, the user can click the mouse again to stop the dragging action. In other illustrative embodiments, the user holds the mouse button down to mark the start location 312, holds the button down while dragging the end location 314 of the range 316, and releases the mouse button at the desired position for the end location 314. The range is graphically highlighted as a shaded area (shown with crosshatches), though any other means of displaying the range (e.g., colors or outlines) are contemplated and within the scope of the present disclosure. While in the range definition mode, the user also has the option of selecting and adjusting both the start and end locations. As the user moves either location, whether initially or after the initial definition, depth values displayed for each location are updated.

As shown in FIG. 3, in at least some illustrative embodiments a "convert to interval" icon 318 is displayed once range 314 is created. After a user is satisfied with a defined range 316, the user clicks icon 318 to save the defined range as an interval, which is displayed within the interval presentation display 400 shown in FIG. 4. The ranges and/or intervals will be used in a subsequent determination of stand-off device placements along the pipe string. Typically, each range will necessitate the placement of multiple stand-off devices along the pipe string so that, as one stand-off device exits the range during the pipe string insertion, another stand-off device enters the range.

Figure 4:
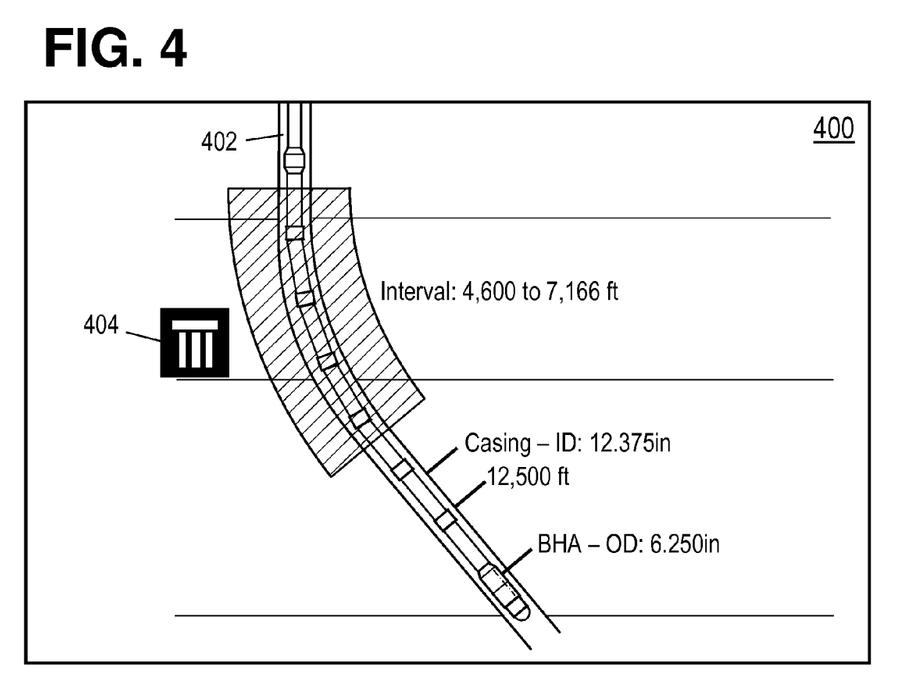
FIG. 4 shows an illustrative interval presentation display.

In the illustrative embodiment shown, the start and end depths along pipe string 402 are shown next to the interval. As with ranges, intervals are graphically indicated as a shaded area (shown with crosshatches) and can also be shown using any alternative highlighting. An interval may also be adjusted in the same manner as the ranges by moving either the start or end locations of the interval using the mouse to select and move the desired location. The interval presentation display also shows a trashcan icon 404 next to each interval that, when selected, initiates a deletion of the associated interval. Also, in at least some illustrative embodiments, any overlap between intervals is highlighted in a manner different from the interval highlight (e.g., a different shading, crosshatch or color) to indicate an error.

By allowing the user to interactively define the borehole ranges and pipe string intervals on a graphical representation of the wellbore and pipe string, a user can see where the various elements of the wellbore are positioned relative to the intervals being defined. The user interacts directly with the graphical representation without having to switch focus to, for example, a dialog box to manually enter the depth values for the start and end locations of the interval. Also, in at least some illustrative embodiments the pipe string behavior is simulated and shown to reveal those borehole locations where the pipe string buckles and contacts the borehole wall. The user may then use the identified buckling/contact locations as a basis for determining where to position one or more stand-off devices. In still other illustrative embodiments, software is executed that factors the buckling and contact locations into an automated determination of one or more stand-off device positions. A simulation may be executed subsequent to each stand-off device placement to determine the effect of placing the stand-off device(s) at the determined positions. Additional simulation iterations may be performed as necessary to fine tune the stand-off device position(s), and prior simulation results and/or stand-off device positions may be provided as input to subsequent simulations. Once determined and optionally fine-tuned, the stand-off device position(s) are provided to field personnel that are, e.g., locating the stand-off devices at said positions along a casing as it is inserted into the borehole.

It should be noted that although the embodiments described and illustrated in the figures only show a single interval, multiple intervals may be defined using the disclosed methods and systems. When multiple intervals are defined, the relationships between the intervals may also be used as a basis for determining the number and positions of stand-off devices needed. Further, in at least some illustrative embodiments, additional information may be provided by the user such as, for example, the type of stand-off device used and the spacing between stand-off devices.

Figure 5:
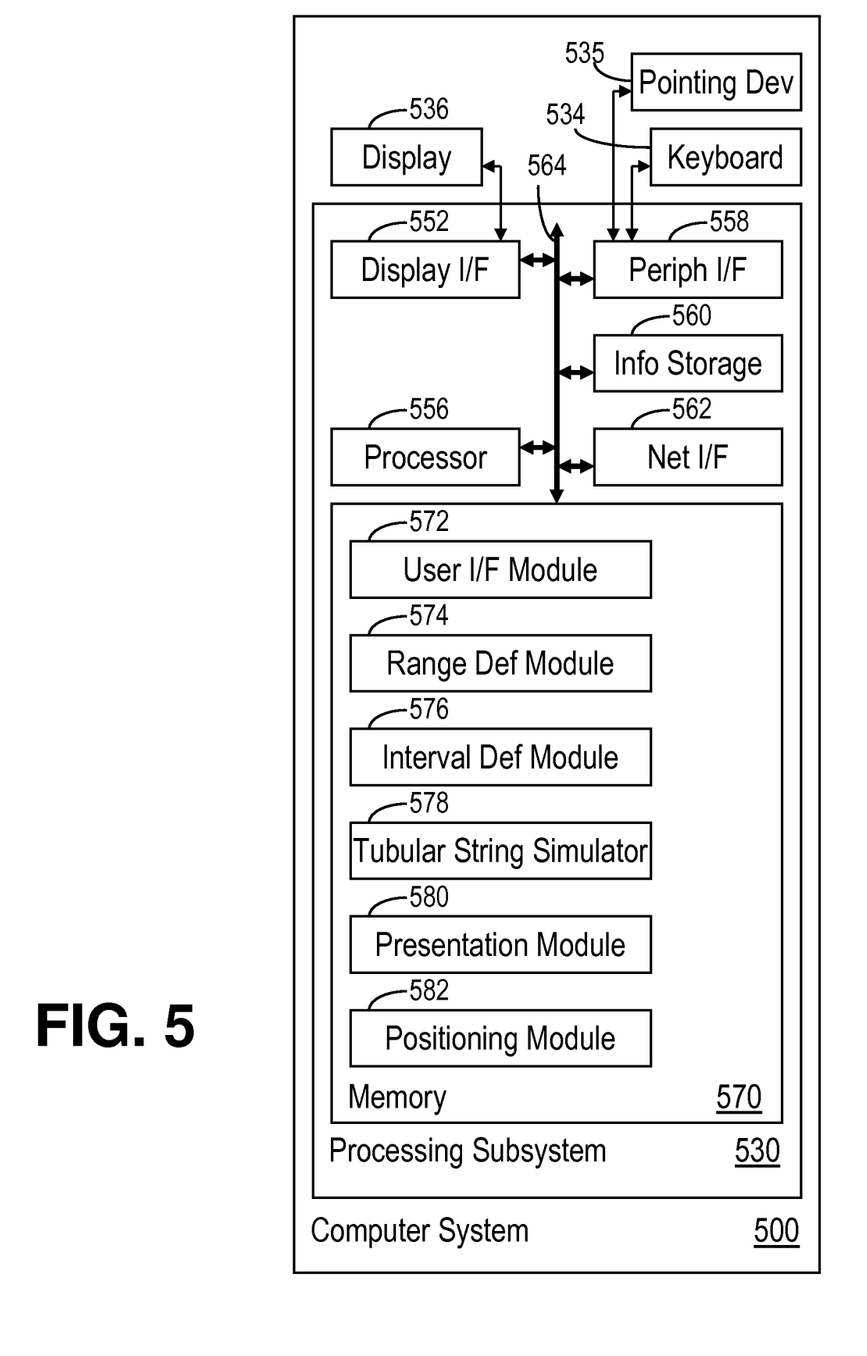
FIG. 5 shows an illustrative computer system suitable for implementing the disclosed methods.

In at least some illustrative embodiments, the above-described graphical methods for defining ranges for the borehole and intervals for the pipe string to be centralized is implemented in software that executes on a computer system such as computer system 500 of FIG. 5, which is similar to the computer system shown in FIG. 1. Both hardware and software components of computer system 500 are shown, which in at least some illustrative embodiments implement at least part of the pipe string interval definition planning shown as method 600 in FIG. 6 (described in more detail below). A user may interact with computer system 500 via keyboard 534, pointing device 535 (e.g., a mouse) and display 536 to configure, control and monitor the execution of the pipe string interval definition planning system.

Located within processing subsystem 530 of computer system 500 is a display interface 552, a processor 556, a peripheral interface 558, an information storage device 560, a network interface 562 and a memory 570. Bus 564 couples each of these elements to each other and transports their communications. Network interface 562 enables communications with other systems (e.g., via the Internet with a central database server housing well logging data). In accordance with user input received via peripheral interface 558 and program instructions from memory 570 and/or information storage device 560, processor 556 processes input from the user and applies it to the well logging data to perform the disclosed methods and present the results to the user. Storage device 560 may be implemented using any number of known non-transitory information storage media, including but not limited to magnetic disks, solid-state storage devices and optical storage disks.

Various software modules are shown loaded into memory 570 of FIG. 5, where they are each accessed by processor 556 for execution. These modules include: User Interface Module 572, which interacts with the input/output devices utilized by the user to interact with processing system 530; Range Definition Module 574, which creates ranges from user-provided initial range start and end location selections and accepts adjustments to those selections; Interval Definition Module 576, which converts borehole ranges into pipe string intervals and further accepts adjustments to the start and end locations of the intervals; Tubular String Simulator 578, which simulates the behavior of the pipe string when subjected to the forces expected downhole; Presentation Module 580 which presents to a user graphical representations of the ranges, intervals and simulator results; and Positioning Module 582, which computes positions for stand-off devices based on the selected interval(s) and optionally further based on the simulator results.

Figure 6:
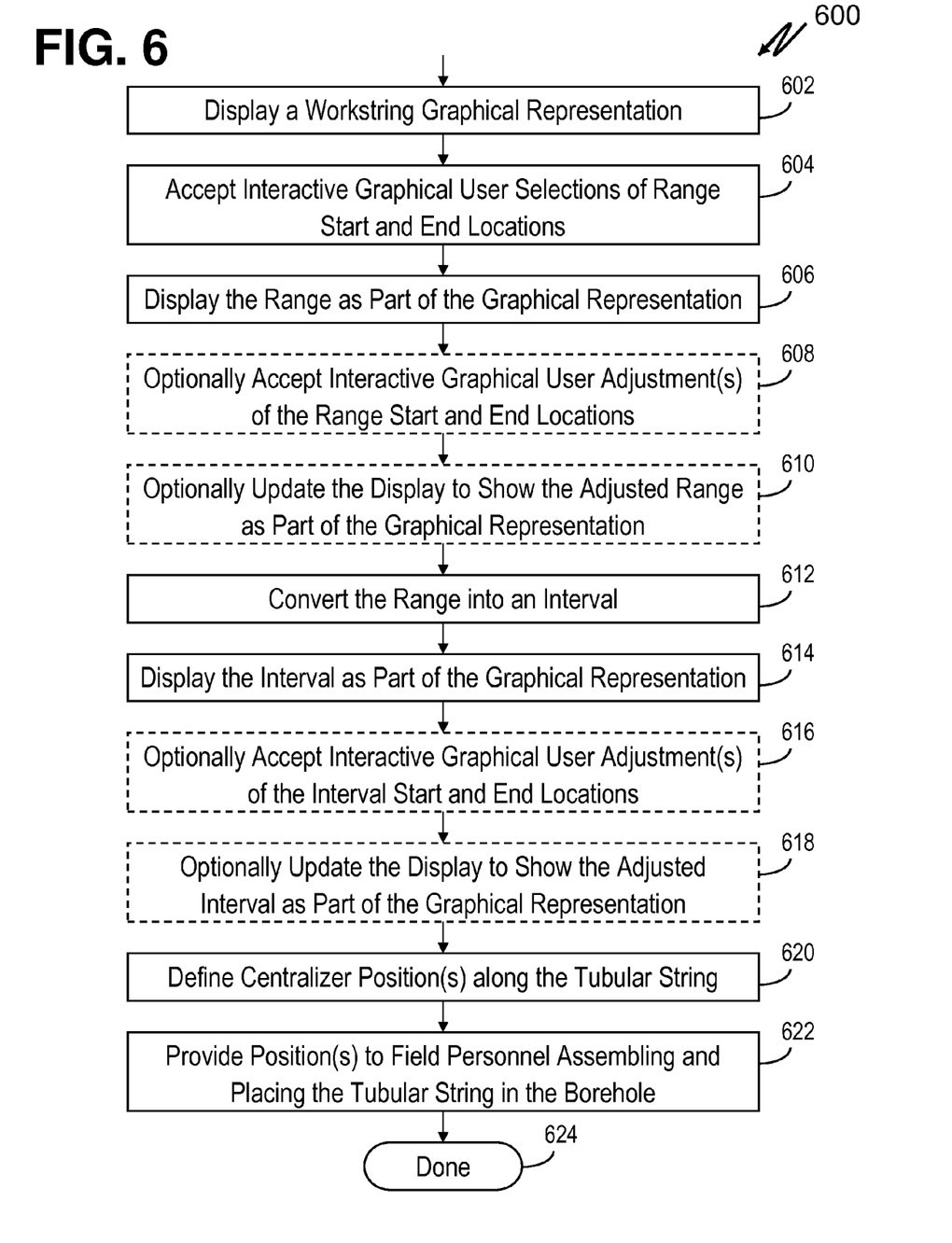
FIG. 6 shows an illustrative method for performing the disclosed pipe string interval definition.

FIG. 6 shows an illustrative method that implements the above-described graphical methods for defining ranges and intervals for the pipe string to be centralized, at least part of which may be implemented by software executing on computer system 500. It should be noted that although the embodiment of FIG. 5 shows various software modules executing on computer system 500, in other illustrative embodiments some or all of the modules may execute on two or more computers within a networked and/or distributed system. Referring to both FIGS. 5 and 6, the pipe string within the borehole is displayed as a graphical representation to a user (block 602; User I/F Module 572). In at least some illustrative embodiments, the user can execute a simulation that produces a display of the pipe string showing locations where buckling and borehole wall contact occurs without stand-off devices (Tubular String Simulator 578). Once the pipe string is displayed, the user enters a range selection mode and uses pointing device 535 (e.g., a mouse) to select the locations along the borehole for both the start and end locations of the desired range (block 604; Range Definition Module 574).

The defined range is presented as an overlay on the graphical representation of the pipe string and borehole (block 606; User I/F Module 572). The range start and end locations may be optionally be adjusted by the user using the mouse to select and move the locations (block 608; Range Definition Module 574), which produces a corresponding optional update to the display of the range (block 610; User I/F Module 572). Once the range is defined and/or adjusted as desired, the user initiates the conversion of the range into an interval (block 612; Interval Definition Module 576), and the newly defined module is presented to the user as an overlay on the graphical representation of the pipe string and borehole (block 614; Presentation Module 580), replacing the range overlay previously displayed. The interval start and end locations may be optionally be adjusted by the user using the mouse to select and move the locations (block 616; Interval Definition Module 576), which produces a corresponding optional update to the display of the range (block 618; Presentation Module 580). Once the interval has been defined and adjusted, one or more stand-off device positions are defined for the interval (block 620, Positioning Module 582). The stand-off device position(s) may be defined manually by the user based on the interval and simulation data presented to the user, or may alternatively may be determined by Positioning Module 582 and presented to the user as another overlay on the graphical representations of the pipe string and borehole (Presentation Module 580). The resulting stand-off device position(s) is/are subsequently provided to field personnel, who locate the stand-off devices at said positions along the pipe string prior to introducing the pipe string into the borehole (block 622), ending the method (block 624).

Numerous other modifications, equivalents, and alternatives, will become apparent to those skilled in the art once the above disclosure is fully appreciated. For example, although the illustrative embodiments are described within the context of drilling and cementing operations, the described embodiments are also suitable for use in other downhole environments such as completed wells (e.g., pipe strings used to close a well or workover a well) and all such environments are within the scope of the present disclosure. Also, although described within the context of a pipe string, other illustrative embodiments of the described methods and systems may also be applicable to various tubular strings, including production tubing and drillstrings. It is intended that the following claims be interpreted to embrace all such modifications, equivalents, and alternatives where applicable.

What is claimed is:

1. A Graphical User Interface (GUI) facilitated centralization method, the method comprising:
displaying a graphical representation of a tubular string within a borehole;
accepting an interactive graphical selection of a starting location for a range along the borehole;
accepting an interactive graphical selection of an ending location for the range along the borehole;
determining string stand-off device positions that provide centralization of the tubular string within the range along the borehole; and
providing said positions to field personnel assembling and placing the tubular string in the borehole.

2. The method of claim 1, wherein the tubular string comprises a pipe string, a drillstring or a production tubing.

3. The method of claim 1, further comprising accepting an interactive graphical adjustment to the range starting location or the range ending location.

4. The method of claim 1, further comprising:
executing a first simulation of the tubular string within the borehole to identify one or more predicted locations where the tubular string buckles or contacts the borehole wall; and
determining at least one string stand-off device position based at least in part on the one or more predicted locations.

5. The method of claim 4, further comprising:
executing a second simulation of the tubular string within the borehole that includes the at least one string stand-off device; and
providing the at least one string stand-off device position if the second simulation indicates that the at least one string stand-off device reduces the tubular string buckling or contacting with the borehole wall compared to the first simulation.

6. The method of claim 1, further comprising displaying borehole or tubular string information as part of the graphical representation.

7. The method of claim 6, wherein the borehole or tubular string information is selected from the group consisting of a borehole range, a borehole range start location, a borehole range end location, a tubular string outer diameter, a tubular string inner diameter, a borehole inner diameter, a borehole depth and a bottom hole assembly outer diameter.

8. A Graphical User Interface (GUI) facilitated centralization system, comprising:
a memory having tubular string centralization software; and
one or more processors coupled to the memory, the software causing the one or more processors to:
display a graphical representation of a tubular string within a borehole;
accept an interactive graphical selection of a starting location for a range along the borehole;
accept an interactive graphical selection of an ending location for the range along the borehole;
determine string stand-off device positions that provide centralization of the tubular string within the range along the borehole; and
provide said positions to field personnel that assemble and place the tubular string in the borehole.

9. The system of claim 8, wherein the tubular string comprises a pipe string, a drillstring or a production tubing.

10. The system of claim 8, wherein the software further causes the one or more processors to accept an interactive graphical adjustment to the range starting location or the range ending location.

11. The system of claim 8, wherein the software further causes the one or more processors to:
execute a first simulation of the tubular string within the borehole to identify one or more predicted locations where the tubular string buckles or contacts the borehole wall; and
determine at least one string stand-off device position based at least in part on the one or more predicted locations.

12. The system of claim 11, wherein the software further causes the one or more processors to:
execute a second simulation of the tubular string within the borehole that includes the at least one string stand-off device; and
provide the at least one string stand-off device position if the second simulation indicates that the at least one string stand-off device reduces the tubular string buckling or contacting with the borehole wall compared to the first simulation.

13. The system of claim 8, wherein the software further causes the one or more processors to display borehole or tubular string information as part of the graphical representation.

14. The system of claim 13, wherein the borehole or tubular string information is selected from the group consisting of a borehole range, a borehole range start location, a borehole range end location, a tubular string outer diameter, a tubular string inner diameter, a borehole inner diameter, a borehole depth and a bottom hole assembly outer diameter.

15. A non-transitory information storage medium comprising Graphical User Interface (GUI) facilitated centralization software that comprises:
a range definition module that accepts an interactive graphical selection of a starting location for a range along a borehole, and further accepts an interactive graphical selection of an ending location for the range along the borehole;
a presentation module that displays a graphical representation of a tubular string within the borehole, and further displays the range along the borehole as part of the graphical representation; and
a positioning module that determines string stand-off device positions that provide centralization of the tubular string within the range along the borehole, and further provides said positions to field personnel that assemble and place the tubular string in the borehole.

16. The medium of claim 15, wherein the tubular string comprises a pipe string, a drillstring or a production tubing.

17. The medium of claim 15, wherein the range definition module further accepts an interactive graphical adjustment to the range starting location or the range ending location.

18. The medium of claim 15,
wherein a tubular string simulator performs a first simulation of the tubular string within the borehole to identify one or more predicted locations where the tubular string buckles or contacts the borehole wall; and
wherein the positioning module further defines at least one string stand-off device position based at least in part on the one or more predicted locations.

19. The medium of claim 18,
wherein the tubular string simulator further performs a second simulation of the tubular string within the borehole that includes the at least one string stand-off device; and
wherein the positioning module further provides the at least one string stand-off device position if the second simulation indicates that the at least one string stand-off device reduces the tubular string buckling or contacting with the borehole wall compared to the first simulation.

20. The medium of claim 15,
wherein the presentation module further displays borehole or tubular string information as part of the graphical representation; and
wherein the borehole or tubular string information is selected from the group consisting of a borehole range, a borehole range start location, a borehole range end location, a tubular string outer diameter, a tubular string inner diameter, a borehole inner diameter, a borehole depth and a bottom hole assembly outer diameter.

* * * * *